United States Patent [19]

Farley et al.

[11] 4,002,589
[45] Jan. 11, 1977

[54] PREPARATION OF WATER SOLUBLE SEGMENTED POLYMERS

[75] Inventors: David E. Farley, Pittsburgh; Janice Elaine Morgan, Clinton, both of Pa.

[73] Assignee: Calgon Corporation, Pittsburgh, Pa.

[22] Filed: Jan. 13, 1975

[21] Appl. No.: 540,359

[52] U.S. Cl. ............. 260/29.6 WQ; 260/29.6 BM; 260/29.6 HN; 260/29.6 MM; 260/875; 260/895

[51] Int. Cl.² ................. C08L 51/08; C08L 53/00

[58] Field of Search .......... 260/29.6 WQ, 29.6 BM, 260/29.6 HN, 29.6 MM, 875, 29.6 RW, 29.6 WA

[56] References Cited

UNITED STATES PATENTS

| | | | |
|---|---|---|---|
| 2,922,768 | 1/1960 | Mino et al. | 260/885 |
| 3,041,318 | 6/1962 | Hess | 260/29.6 WQ |
| 3,244,657 | 4/1966 | Grosser et al. | 260/886 |
| 3,284,393 | 11/1966 | Vanderhoff et al. | 260/29.6 H |
| 3,755,234 | 8/1973 | Chujo et al. | 260/875 |
| 3,772,407 | 11/1973 | Williams et al. | 260/875 |

*Primary Examiner*—M. J. Welsh
*Attorney, Agent, or Firm*—Rudolph J. Anderson, Jr.; Harry E. Westlake, Jr.; Raymond M. Speer

[57] ABSTRACT

Water-soluble segmented polymers of the

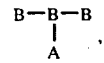

A—B—A, and (A—B)$_n$ types wherein the A-segments are grafted homopolymer, copolymer and/or terpolymer segments of water-soluble vinyl monomers, and the B-segments are homopolymer segments of poly(vinyl pyrrolidone) or poly(vinyl alcohol), are prepared by a process employing inverse emulsion techniques and cerium (IV) salt initiators.

9 Claims, No Drawings

PREPARATION OF WATER SOLUBLE SEGMENTED POLYMERS

BACKGROUND OF THE INVENTION

The present invention relates to a novel method of preparing water-soluble segmented polymers of the

A—B—A, and (A—B)$_n$ types, and to the use of these polymers as flocculants.

More particularly, the present invention relates to a novel method based on inverse (water-in-oil) emulsion techniques and ceric ion grafting techniques for preparing water-soluble segmented polymers of the

A—B—A, and (A—B)$_n$ types, wherein the A segments contain from 10 to 100,000 mer units comprising grafted homopolymer, copolymer and/or terpolymer segments of water-soluble vinyl monomers, and the B segments contain from 10 to 5,000 mer units comprising homopolymer segments of poly(vinyl pyrrolidone) or poly(vinyl alcohol); and to the use of these polymeric compositions as flocculants, particularly for control of silt settling and silt deposit.

The term "segmented polymers" is intended to include copolymer structures recognized as graft copolymers and copolymer structures recognized as block copolymers. These two types of segmented polymers have been illustrated by the general formulas:

for the graft copolymers, and A—B—A, and (A—B)$_n$ for the block copolymers where A—B—A is illustrative of a triblock copolymer. These formulas are general and illustrative only, however, since it will be appreciated that certain obvious modifications will readily occur to those skilled in the art.

The method of the present invention utilizes cerium (IV) salts to prepare segmented polymers. The use of cerium (IV) salts to initiate graft polymerization of vinyl monomers onto poly(vinyl alcohol) is described in Mino and Kaizerman U.S. Pat. No. 2,922,768. See also a further description of such techniques in "Grafting to Vinylpyrrolidone Polymers and Copolymers by the Ceric Ion Method," Guilbault and Brooks, *J. Macromol. Sci.-Chem.*, A7(8), pp. 1581–90 (1973).

Reference is made to copending application Ser. No. 465,660, now U.S. Pat. No. 3,907,927, which discloses polymer compositions similar to those described herein, prepared by solution polymerization, and to copending application Ser. No. 465,716, now U.S. Pat. No. 3,900,338, which discloses the use of such compositions as silt control agents.

It is known in the art to prepare graft and block copolymers in standard emulsion form. See, for example, Grosser et al. U.S. Pat. Nos. 3,244,657 and 3,244,658, and Chujo et al. U.S. Pat. No. 3,755,234. The latter patent additionally employs cerium (IV) salt grafting. However, unlike the methods of the prior art, which employ vinyl monomers which are insoluble in water and which carry out polymerization using standard (oil-in-water) emulsion techniques, the method of the present invention employs water-soluble vinyl monomers and carries out polymerization using inverse emulsion techniques. See Vanderhoff et al. U.S. Pat. No. 3,284,393 for a description of water-in-oil emulsion polymerization in general.

Reference is made to copending application Ser. No. 487,931 which discloses inverse emulsion polymerization methods.

By means of the inverse emulsion polymerization technique, high solids, liquid form graft and block copolymers useful in various applications may be produced directly in a highly stable, especially useful inverse emulsion form. (The term "high solids" refers to a high concentration of polymer product dissolved in the dispersed water phase which is in turn distributed or dispersed in the continuous oil phase.) Graft and block copolymers of high solids concentrations are produced which are highly stable, yet readily water dispersible, thus facilitating their employment in the various areas of use.

The segmented polymers prepared by the method of the present invention possess certain advantages over the same or similar polymers prepared in accordance with other methods. The high solids concentrations of the polymers of the present invention are obtained without undesirable viscosity buildup. The polymer products of the present invention also possess excellent stability and therefore have improved shelf life. They are readily dispersed in water without the requirement of troublesome and time-consuming feed solutions and equipment.

SUMMARY OF THE INVENTION

The poly(vinyl pyrrolidone) segments of the graft and block copolymers of the present invention are prepared from N-vinyl-2-pyrrolidone monomer preferably by polymerization in aqueous media using inorganic and organic peroxygen or peroxide compounds. Poly(vinyl pyrrolidone) prepared from N-vinyl-5-methyl-2-pyrrolidone and N-vinyl-3,3-dimethyl-2-pyrrolidone monomers may be used. Molecular weight of the poly(vinyl pyrrolidone) segments may be as low as a few hundred to well over one million. This has been expressed in terms of a range of number of mer units of from 10 to 5,000. The Fickentscher K-valve is a convenient designation of the relative degree of polymerization, and thus molecular weight. Thus, generally, poly(vinyl pyrrolidone) materials having a K-value of about 10 to 200, and preferably about 30 to 120, as well as mixtures of these, may be employed. Poly(vinyl pyrrolidone) of K-value 90 has been found particularly useful.

Poly(vinyl alcohol) materials forming segments of the graft and block copolymers of the present invention are employed in the same general molecular weight range as the poly(vinyl pyrrolidone) materials described above, which has been expressed in terms of a range of number of mer units of from 10 to 5,000.

Water-soluble vinyl monomers which are suitable for producing grafted homopolymer, copolymer and/or terpolymer segments include, among others, dimethyl diallyl ammonium chloride, 3-acrylamido-3-methyl butyl trimethyl ammonium chloride, methacryloyloxy-2-hydroxypropyl trimethyl ammonium chloride, methacryloyloxyethyl trimethyl ammonium chloride, methacryloyloxyethyl trimethyl ammonium methosulfate, 2-acrylamido-2-methylpropane sulfonic acid, acrylic acid and salts thereof, methacrylic acid, 3-acrylamido-3-methyl butyl dimethylamine, acrylamide, methacryamide, diacetone acrylamide, hydroxymethylated diacetone acrylamide, dimethyl-1-(2-hydroxypropyl) amine methacrylamide, and sodium styrene sulfonate. Particularly preferred, however, are 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, and acrylamide.

As indicated, the water-soluble vinyl monomers may be employed to produce either homopolymer segments, copolymer segments or terpolymer segments, or combinations of these. The molecular weight range of these polymer segments may vary from a few hundred to several million, which has been expressed in terms of a range of number of mer units of from 10 to 100,000.

The relative proportions or molar ratios of poly(vinyl pyrrolidone) or poly(vinyl alcohol) to total water-soluble vinyl monomer in the segmented block and graft copolymers of the present invention may vary over a considerably wide range, at least as great as 100:1 to 1:100. The molar ratio actually employed will be determined largely by the particular utility for which the segmented polymer is being used.

A particularly preferred segmented polymer composition prepared by the method of the present invention is a triblock copolymer having a structure represented by the formula A—B—A, wherein A represents polyacrylamide segments and B represents a poly(vinyl pyrrolidone) segment.

The cerium (IV) salts which may be used to initiate graft and block polymerization of the water-soluble vinyl monomers include cerium nitrate, cerium sulfate, cerium iodide, ammonium cerium nitrate, ammonium cerium sulfate and ammonium cerium pyrophosphate. While concentration of the cerium salt initiator has not been found to be critical, the concentration employed will usually be within the range of 0.01 to 2.0 mole percent, and preferably from about 0.05 to about 1.5 mole percent, based on moles of monomer or monomers in the polymerization mixture. Where poly(vinyl pyrrolidone) comprises one or more of the segments, it has been found that where the poly (vinyl pyrrolidone) is of higher molecular weight, for example, 300,000 to 1,000,000 or more, that it is desirable to employ from 10 to 30 moles of cerium (IV) salt initiator per single mole of poly(vinyl pyrrolidone). Generally, however, the amount of cerium (IV) salt initiator which may be employed will be in the range of from 300:1 to 2:1 moles of cerium (IV) salt to mole of poly(vinyl pyrrolidone).

The method of the present invention is carried out in an inverse emulsion environment, that is, an emulsion environment in which the continuous phase is a relatively inert hydrophobic liquid, and the discontinuous phase is an aqueous solution of reactants. The inert hydrophobic liquid is preferably a hydrocarbon liquid, including both aromatic and aliphatic compounds. For example, such hydrocarbon liquids as mineral oils, mineral spirits, kerosene, benzene, xylene, toluene, naphtha, and so forth, are suitable. Particularly preferred oil phase materials are Soltrol 220, Mentor 28 and Peneteck NF, all complex mixtures of petroleum hydrocarbons available from Phillips Petroleum Company, Exxon Corporation and Pennsylvania Refining Company, respectively.

The relative proportions of the water and oil phases may be varied over a considerable range. While other factors, such as the amount of surfactant employed, may require a corresponding adjustment, the method of the present invention may be carried out under varying phase proportions with equal success.

The surfactant system employed plays an important role in maintaining the proper inverse emulsion environment, and thus is essential to successful operation of the method of the present invention, as well as to the required properties of the resultant products. The surfactants employed in the method of this invention are of the non-ionic type. Suitable nonionic surfactants may be, for example, condensation products of higher fatty alcohols with ethylene oxide, condensation products of alkyl phenols with ethylene oxide, condensation products of higher fatty acid amides with ethylene oxide, polyethylene glycol esters of long chain fatty acids, polyhydric alcohol partial higher fatty acid esters, ethylene oxide condensation products of polyhydric alcohol partial higher fatty esters, and their inner anhydrides, and long chain polyglycols in which one hydroxyl group is esterified with a higher fatty acid and the other hydroxyl group is esterified with a low molecular weight alcohol.

Preferred surfactants are those selected from the group consisting of polyethoxylated fatty esters, such as laurates, stearates, and oleates. Ethoxylated oleates are particularly preferred. Among the specific surfactants which have been used with success are the following: Atlas G-1086 (polyoxyethylene 40 sorbitol hexaoleate), Arlacel 83 (sorbitan sesquioleate), Tween 85 (20 oxyethylene sorbitan trioleate), Tween 80 (sorbitan monooleate) and Span 85 (sorbitan trioleate), all available from ICI America.

As would be expected, some surfactants are more efficient than others in the method of the present invention. Some surfactants which perform suitably for low solids concentrations inverse emulsions will not give satisfactory results for higher concentrations of solids in the inverse emulsion, whereas other surfactants will perform well with the higher solids concentrations. In addition, a combination of two or more surfactants may be used. For example, particularly good results have been achieved using a dual surfactant system comprising Atlas G-1086 and Arlacel 83.

Candidate surfactants were also evaluated on the basis of their hydrophilic/lipophilic balance (HLB) rating. The HLB number correlates roughly with the solubility of the particular surfactant in water. It was found desirable to employ a surfactant or combination of surfactants with an HLB number in the range of from about 7.0 to about 10.0.

It was found that the surfactant concentration should be at least 4% by weight of the total system, and preferably should be about 10% by weight. While larger amounts of surfactant may be employed, diminishing benefit is usually experienced and economic considerations will ordinarily limit the employment of such larger amounts of surfactant.

The segmented polymer preparation method of the present invention must be carried out under acid pH conditions, that is, below pH 7. This is a consequence of the fact that under alkaline pH conditions a precipitate of cerium (IV) hydroxide is formed, thus interfering with the ceric ion initiation.

The temperature parameters for the preparation reaction are generally that the reaction may take place at temperatures between 0° and 100° C., and that preferably the reaction is carried out at from about 20° to about 60° C. Usually, the reaction will be carried out at room temperature.

The time parameters have not been found to be critical and the preparation reaction may be carried out over an extended period of time, for example, overnight. Reaction times are, of course, roughly in a reciprocal relationship with reaction temperatures, higher temperatures resulting in shortened reaction times.

Generally, the sequence of steps whereby the method of the present invention is carried out is not critical with regard to the order of addition of the reactants. Thus the poly(vinyl pyrrolidone), poly(vinyl alcohol) and vinyl monomer reactants can be dissolved separately in water and then added to the continuous oil phase either together or one after the other. Also, all of the reactants may be dissolved together in water and then added to the continuous oil phase. The aqueous solution of cerium (IV) salt initiator may be added in any sequence with the reactants, excluding only mixing together in the water phase all of the reactants and the cerium (IV) salt initiator. The surfactant system should be added to the continuous, oil phase and not to the water phase. Thus, it is intended that the preparation method of the present invention includes basically all combinations of reactant and initiator addition, with the single exception noted above.

The graft and block copolymer products prepared according to the method of the present invention are useful as flocculants for the precipitation of many substances from municipal and industrial wastes. Thus employed, these polymer products will generally be effective in concentration amounts of from about 0.1 to about 20 parts per million (ppm) by weight of the total system being treated. The polymers of the present invention may be used in quantities as small as 0.05 ppm. There is not known to be a lower limit beyond which they are absolutely ineffective; and a very small amount is effective to a small degree. Although a practical limit will be reached at a maximum of about 20 ppm., it is possible to use larger amounts, for example, up to about 200 ppm. The preferred usage range is from about 1 to about 5 ppm. The polymer products may be used alone or in conjunction with conventional inorganic flocculants or coagulants, such as alum. The graft and block polymer products of the present invention have been found particularly effective in controlling settling and deposits of silt comprised of iron oxides and clay particles of various compositions. Thus, the present invention relates to methods of prevention, control, and removal of alluvium in aqueous systems through the use of the segmented polymers prepared according to the methods described herein. Deposits of silt and alluvium are often found in cooling towers, once-through cooling systems, and the like. Such deposits impair the heat transfer capacity of the unit not only by limiting the circulation of water, but by insulating the hot metal surface to be cooled. Such problems are considerably reduced when the segmented polymers prepared according to the methods of the present invention are added as inverse emulsions to the water to be treated, and circulated into and through the system in contact with the alluvium and silt, which may be suspended or already deposited. The silt or alluvium, together with the treatment polymer, forms a light floc and this floc is then flushed out of the system. Thus, for best results, the treatment polymer should be added continuously or at least periodically.

The following examples are illustrative of the preparation method of the present invention and of the effectiveness of the polymer products of that method.

EXAMPLE 1

Preparation of Poly(vinyl pyrrolidone) and Polyacrylamide Block Copolymer (PVP-b-Am)

The reactants and other additives employed and their total amounts were as follows:

| Material | Oil Phase Amount (Grams) |
|---|---|
| Mentor 28 | 75.01 |
| Atlas G-1086 | 21.55 |
| Arlacel 83 | 3.60 |
| Material | Water Phase Amount (Grams) |
| Poly(vinyl pyrrolidone) (Mol. Wt. about 360,000) | 2.3 |
| Acrylamide monomer | 72.7 |
| Distilled water | 75.0 |

The oil phase ingredients specified above were stirred together until a homogeneous mixture was obtained, which was then transferred to a reaction vessel. The water phase ingredients specified above were stirred together until all of the poly(vinyl pyrrolidone) and acrylamide monomer were dissolved in the water. The solution was then transferred to a 125 ml. addition funnel, whereupon 25 ml. of the solution was added to the oil phase mixture while it was being rapidly stirred. The reaction mixture was then purged with nitrogen for 1 hour. A cerium (IV) salt initiator solution was prepared by dissolving 0.354 g. of ammonium ceric nitrate $[(NH_4)_2Ce(NO_3)_6]$ in 6.47 ml. of 0.1 N nitric acid and then diluting up to 100 ml. with water. Ten ml. of this Ce (IV) initiator solution was then added to the reaction mixture. Following this addition, the remaining water phase mixture was added to the reaction mixture over a period of 18 minutes. Thirty minutes after the Ce (IV) initiator was added to the reaction mixture, a 1 to 2 ml. sample of the reaction mixture was withdrawn and injected into about 40 ml. of methanol, upon which a fibrous white precipitate formed with the liberation of heat. Intrinsic viscosity determinations were made on the reaction product using a K292 model viscometer. The value was found to be 7.780.

EXAMPLE 2

Silt Control

A suspension of a synthetic mixture of clays and metal oxides was prepared in distilled water in a graduated cylinder. The time required for the silt to settle to the bottom of the cylinder was measured and recorded. The silt was redispersed in the water and the suspension was dosed with a dilute polymer solution. The time required for the treated silt to settle was measured and recorded. The ratio of the settling time for untreated silt ($tc$) to the settling time for silt treated with polymer ($t$) was calculated. The ratio ($tc/t$) is defined as the efficiency factor (E) and is a measure of polymer utility. The most desirable polymers are those producing the highest E-values.

Table I compares the performance of the segmented polymers of the present invention with that of conventional water soluble polymers of varying composition. Polymer dosages are expressed in milligrams of polymer per liter of synthetic silt suspension.

TABLE I

| Treatment Polymer | Dosage (mg/liter) | Settling Time (sec) | E (efficiency factor) |
|---|---|---|---|
| None (Control) | — | 92.5 | — |
| Poly(vinyl pyrrolidone)/ Acrylamide triblock polymer (of Example 1) | 1.0 | 26.5 | 3.5 |
| Acrylamide Homopolymer | 1.0 | 33.7 | 2.7 |
| Physical Blend of Vinyl Pyrrolidone and Acrylamide Homopolymers[1] | 1.0 | 33.1 | 2.8 |
| Vinylpyrrolidone Homopolymer | 1.0 | 88.6 | 1.1 |

[1]The ratio of poly(vinyl pyrrolidone) to poly(acrylamide) is the same for this physical blend as the ratio of the poly(vinyl pyrrolidone) centerblock to acrylamide end blocks in the triblock polymer described above.

What is claimed is:

1. A method of preparing segmented polymers comprised of segments selected from homopolymers, copolymers and terpolymers of water-soluble vinyl monomers, and segments selected from poly(vinyl pyrrolidone) or poly(vinyl alcohol), which comprises the step of:
reacting, at a pH below 7.0, in an inverse emulsion environment which includes at least 4% by weight of the total system of one or more non-ionic surfactants having an HLB number of from about 7.0 to about 10.0, and in the presence of a cerium (IV) salt initiator, one or more water-soluble vinyl monomers and poly(vinyl pyrrolidone) or poly(vinyl alcohol).

2. The method of claim 1 wherein the water-soluble vinyl monomers are selected from the group consisting of 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, and acrylamide.

3. The method of claim 1 wherein the reactants are poly(vinyl pyrrolidone) and acrylamide.

4. The method of claim 1 wherein the cerium (IV) salt is ammonium cerium nitrate.

5. A method of preparing an inverse emulsion of poly(vinyl pyrrolidone)-block-acrylamide comprising the steps:
dissolving in the water phase of the inverse emulsion, of a portion thereof, poly(vinyl pyrrolidone) and acrylamide monomer;
mixing the thus prepared water phase solution portion or portions with the oil phase of the inverse emulsion comprising a relatively inert hydrophobic liquid and at least 4% by weight of the total system of one or more non-ionic surfactants having an HLB number of from about 7.0 to about 10.0;
adding to the above mixture, maintained at a pH below 7.0, a cerium (IV) salt polymerization initiator.

6. The method of claim 5 wherein the non-ionic surfactants are polyoxyethylene 40 sorbitol hexaoleate and sorbitan sesquioleate.

7. The method of claim 6 wherein the cerium (IV) salt is ammonium cerium nitrate.

8. An inverse emulsion of segmented polymers produced by the process of claim 1.

9. An inverse emulsion of poly(vinyl pyrrolidone)-block-acrylamide produced by the process of claim 5.

* * * * *

UNITED STATES PATENT OFFICE
CERTIFICATE OF CORRECTION

PATENT NO. : 4,002,589
DATED : January 11, 1977
INVENTOR(S) : David E. Farley and Janice Elaine Morgan It is certified that error appears in the above-identified patent and that said Letters Patent are hereby corrected as shown below:

Column 2, line 51 "K-valve" should read -- K-value --.

Column 8, claim 5, line 19 "of a portion thereof," should read -- or a portion thereof, --.

*Signed and Sealed this*

Twenty-ninth *Day of* March 1977

[SEAL]

Attest:

RUTH C. MASON
*Attesting Officer*

C. MARSHALL DANN
*Commissioner of Patents and Trademarks*